United States Patent [19]

Tsuda

[11] Patent Number: 5,745,784
[45] Date of Patent: Apr. 28, 1998

[54] METHOD FOR CHANGING AN EXTERNAL STORAGE MEDIUM IN AN INFORMATION PROCESSING SYSTEM

[75] Inventor: Junichi Tsuda, Tokyo, Japan

[73] Assignee: Fujitsu Limited, Kawasaki, Japan

[21] Appl. No.: 398,523

[22] Filed: Mar. 3, 1995

[30] Foreign Application Priority Data

Mar. 17, 1994 [JP] Japan .................................. 6-047424

[51] Int. Cl.$^6$ ....................................................... H01J 3/00
[52] U.S. Cl. ........................... 395/826; 395/282; 395/822
[58] Field of Search ................................... 395/281, 282, 395/283, 856, 826, 863, 894, 800, 427, 442, 497.01, 700, 835, 836, 838, 851, 879, 825, 822, 832, 833, 859, 872, 881

[56] References Cited

U.S. PATENT DOCUMENTS

| | | | |
|---|---|---|---|
| 4,777,355 | 10/1988 | Takahira | 235/380 |
| 5,038,025 | 8/1991 | Kodera | 235/492 |
| 5,390,331 | 2/1995 | Yui | 395/700 |
| 5,495,586 | 2/1996 | Adachi et al. | 395/280 |
| 5,530,882 | 6/1996 | Sasaki et al. | 395/800 |
| 5,546,585 | 8/1996 | Soga | 395/700 |
| 5,548,740 | 8/1996 | Kiyohara | 395/427 |
| 5,550,999 | 8/1996 | Nagano et al. | 395/442 |
| 5,579,507 | 11/1996 | Hosouchi et al. | 395/497.02 |

*Primary Examiner*—Jack B. Harvey
*Assistant Examiner*—Raymond N. Phan
*Attorney, Agent, or Firm*—Staas & Halsey

[57] ABSTRACT

A method for changing an external storage medium, in an information processing system including an electronic apparatus and at least one external storage medium linked to the electronic apparatus, comprises the steps of: providing an internal storage in the electronic apparatus; delivering a control operation from the electronic apparatus to the external storage medium; copying all processes including a preceding process, a main process and a following process, these being stored in the external storage medium, to the electronic apparatus, the preceding process being necessary to start the main process, and the following process being necessary to complete of the main process; starting an internal program in the internal storage in the electronic apparatus, moving an attribute text indicating a mounting process from the electronic apparatus to the external storage medium by using the internal program on the internal storage; executing the preceding process, the main process and the following process in accordance with the internal program in the electronic apparatus; changing the external storage medium to another one; recovering the moved attribute after completion of all processes; and returning the control operation to an initial state before mounting process.

3 Claims, 4 Drawing Sheets

METHOD FOR CHANGING AN EXTERNAL STORAGE MEDIUM IN AN INFORMATION PROCESSING SYSTEM

BACKGROUND OF THE INVENTION

1. Field of the Invention

The present invention relates to a method for changing an external storage medium, for example, a floppy disk, in an information processing system such as a personal computer, a CAD system or the like.

2. Description of the Related Art

In general, an information processing system such as a personal computer, a CAD system or the like, includes an electronic apparatus (in general, a body) and at least one external storage medium, for example, a floppy disk, inserted and physically and magnetically linked to the electronic apparatus. The external storage medium is frequently changed to new one in accordance with user's requirement. The present invention relates to an improvement in the method of changing the external storage medium in order to reduce the access time to the external storage medium and to achieve a high utilization efficiency thereof.

SUMMARY OF THE INVENTION

The object of the present invention is to provide a method for easily changing an external storage medium so that it is possible to reduce the access time to the external storage medium and to achieve a high utilization efficiency of the external storage medium and particularly, the storage area thereof.

In accordance with the present invention, there is provided a method for changing an external storage medium in an information processing system including an electronic apparatus and at least one external storage medium linked to the electronic apparatus, comprising the steps of:

providing an internal storage in the electronic apparatus;

delivering a control operation from the electronic apparatus to the external storage medium in a mounting process;

copying all processes including a preceding process, a main process and a following process, these being stored in the external storage medium, to the electronic apparatus based on the mounting process, the preceding process being necessary to start the main process, and the following process being necessary to complete the main process;

starting an internal program in the internal storage stored all copied processes in the electronic apparatus;

moving an attribute text indicating the mounting process from the electronic apparatus to the external storage medium by using the internal program on the internal storage;

executing the preceding process, the main process and the following process in accordance with the internal program in the electronic apparatus;

changing the external storage medium to another one;

recovering the moved attribute after completion of all processes; and returning the control operation to an initial state before the mounting process.

As one preferred embodiment, a method for changing an external storage medium further comprises the steps of: holding the preceding process and the following process in the internal storage of the electronic apparatus; executing the main process for another external storage medium; and repeating these processes for the remaining external storage media.

DESCRIPTION OF THE PREFERRED EMBODIMENTS

Before an explanation of the preferred embodiments, a conventional art and its problem will be briefly explained below.

Figure 1:
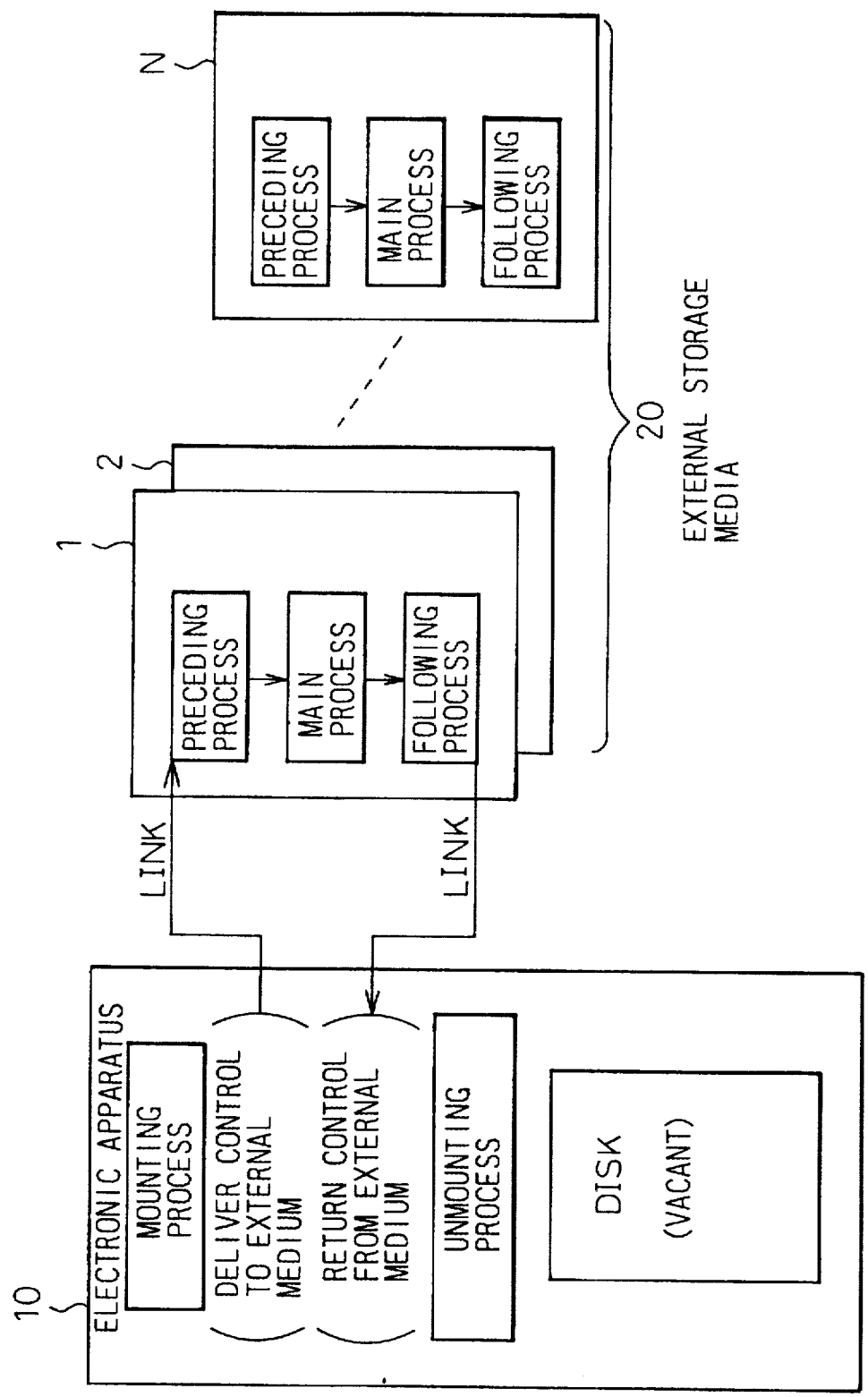
FIG. 1 is an explanatory view of a method for changing an external storage medium in a conventional art.

FIG. 1 is an explanatory view of a method for changing an external storage medium in a conventional art. In FIG. 1, reference number 10 denotes an electronic apparatus, for example, a personal computer, a CAD system or the like. Reference number 20 denotes a plurality of external storage media 1 to N, for example, floppy disks.

The electronic apparatus 10 includes the functions of a "mounting process" and an "unmounting process", and further includes an internal storage (internal disk). In an initial stage, the internal storage is vacant. Each external storage medium 20 stores the functions of a preceding process, a main process, and a following process.

In the electronic apparatus 10, the mounting process executes a process which logically links the electronic apparatus 10 with the external storage medium 20. That is, in accordance with the mounting process, a link is provided between a logical table (not shown) in the electronic apparatus 10 and a logical table in the external storage medium 20, and the mounting table (not shown) is updated after the link is provided. When the link is provided, the preceding process is started in the external storage medium 20.

Further, the unmounting process executes a process which logically unlinks the electronic apparatus 10 from the external storage medium 20. That is, in accordance with the unmounting process, the link is disconnected between the logical table in the electronic apparatus 10 and the logical table in the external storage medium 20, and the mounting table is restored after the link is disconnected.

In the external storage medium 20, the preceding process executes a process which is necessary to start the main process. One example of a preceding process checks the electronic apparatus before use thereof by executing a predetermined test program. In general, this test program is called a "monitor program", and the monitor program executes some checking operations, for example, confirmation of display state in order to ensure an optimum man-machine-interface (MMI), selection and analysis of menus by an operator, assignment of memories and I/O resources, initial setting of functions to be used, and the start of the preceding process.

Further, the following process executes a process which is necessary to complete the main process. The monitor program executes checking operations, for example, a display of the result of checking and the required time for checking, release of assignment of memories and I/O resources, and the end of the following process.

When the electronic apparatus 10 is being operated, first, a control program and predetermined data are stored in the external storage medium 20, for example, a floppy disk. Next, the external storage medium 20 is physically inserted to the electronic apparatus 10. The electronic apparatus 10 is set to access the external storage medium 20, and delivers a control operation to the external storage medium through the link (i.e., a "mounting process"). Accordingly, the external storage medium which is inserted in the electronic apparatus cannot be removed therefrom until the control operation is returned from the external storage medium to the electronic apparatus so that the external storage medium 20 is logically unlinked (i.e., an unmounting process). In general, the process from the mounting process to the unmounting process causes a locked state.

On the other hand, if the external storage medium is forcedly removed from the electronic apparatus 10 during the access state, an abnormal state may occur in the electronic apparatus caused by removal of the external storage medium, particularly in a storage area thereof.

Accordingly, if the external storage medium can be forcedly removed from the electronic apparatus 10 without an abnormal state occurring during an access thereto (i.e., change of the medium), it is possible to considerably raise utilization efficiency of the external storage medium because it is possible to easily change the external storage medium in accordance with a user's requirement.

In actuality, in a conventional method for changing the external storage medium, a predetermined lock mechanism is provided in the electronic apparatus in order to protect the storage medium from accidental removal. Accordingly, it is impossible to change the external storage medium, during an access operation, from the mounting process to the unmounting process. In general, in order to change the external storage medium, first, the control operation is returned from the external storage medium to the electronic apparatus, and next, the external storage medium is changed after completion of the access operation to the external storage medium in the electronic apparatus.

In general, a lock mechanism for protection of the external storage medium is defined in accordance with the specification of the hardware of the electronic apparatus. According to the specification, as one method, the external storage medium cannot be removed mechanically from the electronic apparatus during access operation therein. As another method, even if the external storage medium is accidentally removed, the contents of the external storage medium is protected by a software means.

As explained above, the control operation is delivered from the electronic apparatus to the external storage medium in the mounting process. Concretely, this process is formed of five steps as follows. First, the directory of a source to be connected (i.e., an electronic apparatus) is notified to the external storage medium; second, the name of the external storage medium is notified to the electronic apparatus; third, the mounting process is normally completed (i.e., a link is provided from the electronic apparatus to the external storage medium); fourth, the control operation is delivered from the electronic apparatus to the external storage medium; and fifth, the preceding process is started in the external storage medium.

In the conventional method for changing an external storage medium, the external storage medium cannot be removed from the electronic apparatus during an access operation, and can be removed (changed) only after completion of the preceding and following processes. In this case, each external storage medium stores the control program which is necessary for completion of the preceding and following processes.

Accordingly, it is necessary to provide a large storage area in the external storage medium in order to store the control program including the preceding/following processes. As a result, the storage area which is necessary for the data and the process program are reduced in the external storage medium so that it is difficult to realize effective utilization of the external storage medium. For example, the test program which is stored in the floppy disk (i.e., external storage medium) occupies a third of the storage area. Accordingly, only two thirds of the storage area can be used for data and the control program.

Therefore, in order to resolve the above problem for effective utilization of the storage area, in the present invention, the preceding and the following processes are removed from the external storage medium to the electronic apparatus. As a result, the storage area for the preceding and the following processes in the external storage medium are not necessary so that it is possible to effectively utilize such storage area for data and the process program. Further, although the preceding and the following processes are executed in each external storage medium, since these processes are executed only in the electronic apparatus, it is possible to reduce an actual access time for these processes.

Figure 2:
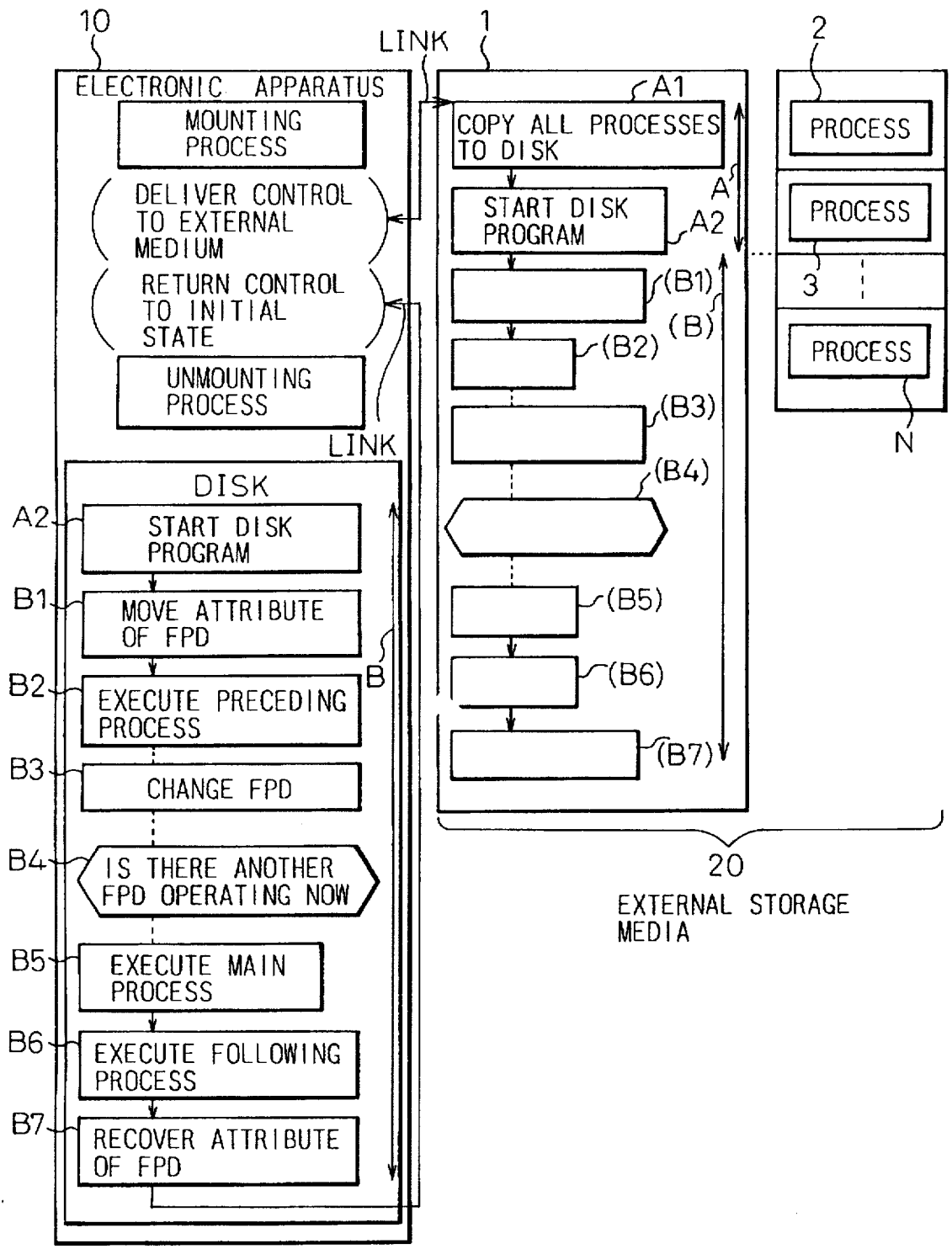
FIG. 2 is an explanatory view of a method for changing an external storage medium according to the present invention.
Figure 3:
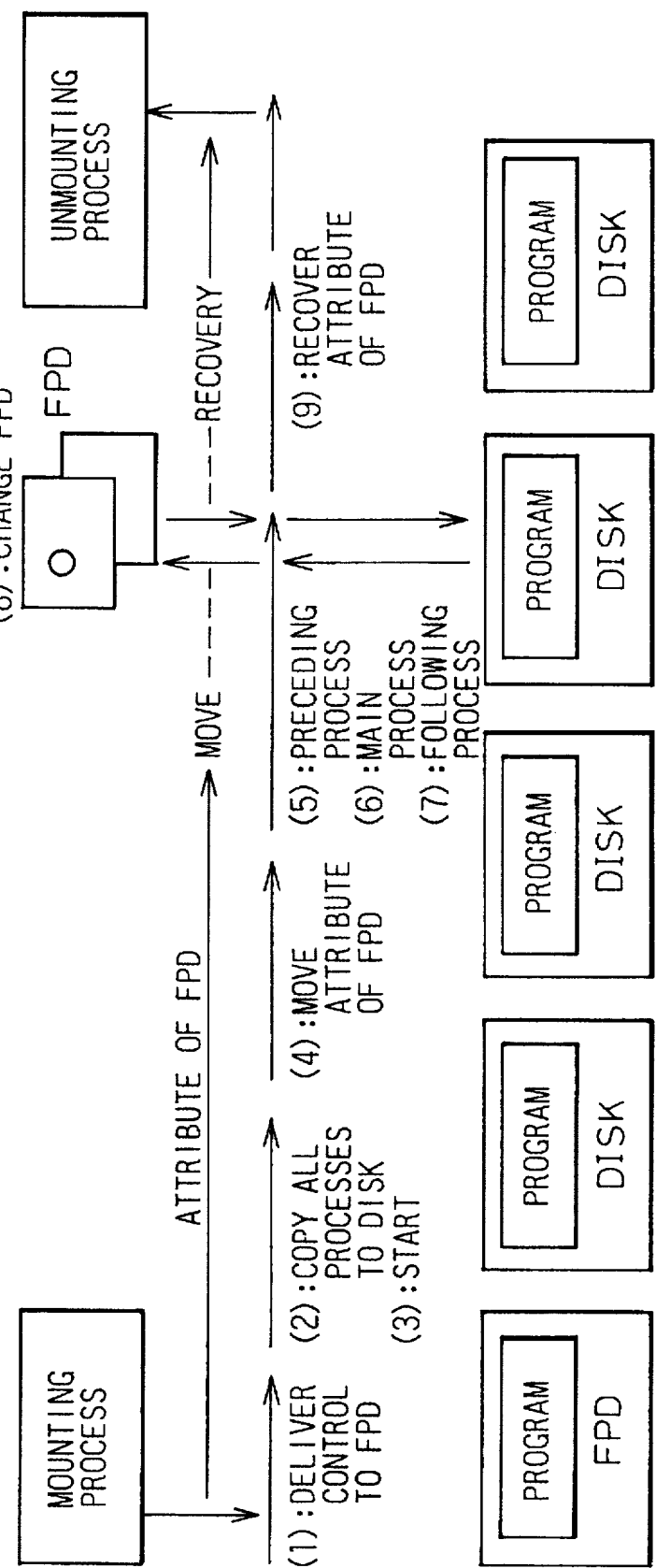
FIG. 3 is a timing chart for explaining the processes of the present invention.
Figure 4:
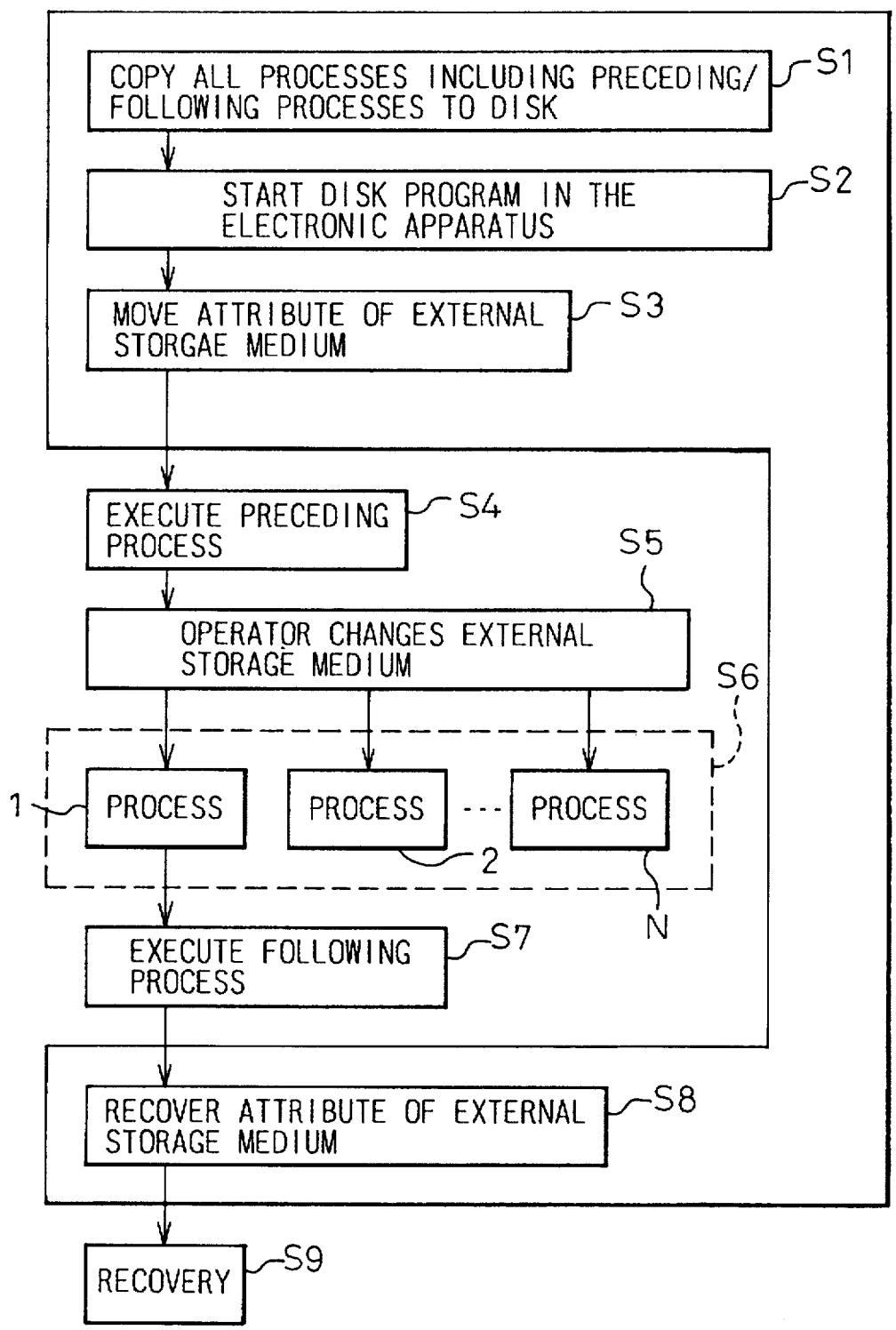
FIG. 4 is a flowchart for explaining the processes of the present invention.

FIG. 2 is an explanatory view of a method for changing an external storage medium according to the present invention, FIG. 3 is a timing chart for explaining processes of the present invention, and FIG. 4 is a flowchart for explaining processes of the present invention.

In FIG. 2, the electronic apparatus includes the mounting process and the unmounting process. Further, the electronic apparatus 10 includes an internal storage (DISK).

In the present invention, first, all processes in the external storage medium 1 are copied to the internal storage of the electronic apparatus, next, the electronic apparatus 10 executes the process B stored on the internal storage in accordance with an internal program (i.e., disk program). Further, the electronic apparatus 10 moves an attribute text indicating the mounting process from the electronic apparatus 10 to the external storage medium 20. After the completion of the above steps, it is possible to easily remove (i.e., change) the external storage medium, for example, a floppy disk (FPD), from the electronic apparatus 10. In this case, a control operation in the mounting process is returned to an initial state, i.e., before the mounting process.

Detailed processes are explained below. The process A includes the steps A1 and A2, and the process B includes the steps B1 to B7. In this case, the step A1 is executed from the external storage medium 1 to the electronic apparatus 10, and the step A2 is executed in the electronic apparatus 10. Further, the process B shown in the external storage medium 1 is copied to the internal storage (DISK) in the electronic apparatus 10.

Before the step A1, the electronic apparatus 10 delivers the control operation to the external storage medium 1 as the mounting process (see, (1) of FIG. 3). In the process A, all processes including the preceding/following processes are copied to the internal storage of the electronic apparatus (A1) (see, (2) of FIG. 3), and the electronic apparatus 10 starts the disk program (A2) in order to execute the process B (see, (3) of FIG. 3).

When the electronic apparatus 10 starts the disk program (A2), the attribute text indicating the mounting process from the electronic apparatus to the floppy disk FPD is moved (B1) (see, (4) of FIG. 3), the preceding process is executed (B2) (see, (5) of FIG. 3), the main process is executed (B5) (see, (6) of FIG. 3), and the following process is executed (B6) (see, (7) of FIG. 3). Further, the attribute text, which is moved in the step (B1), is recovered (B7) (see, (9) of FIG. 3).

Further, after completion of the above steps, the floppy disk FPD is changed (B3) (see, (8) of FIG. 3) to another one. That is, an operator changes the floppy disk to another one in this step. In this case, since the preceding process and the following process are already stored in the internal program of the electronic apparatus, it is possible to easily execute the main process of another floppy disk. Still further, the disk program determines whether another floppy disk is operated (B4). When another floppy disk is operated, this process (B4) is repeated. Finally, the electronic apparatus 10 executes the unmounting process in order to return the electronic apparatus to an original state, i.e., before the mounting process.

In FIG. 4, the steps S1 to S9 basically correspond to the processes A and B of FIG. 2. That is, only step S1 is executed in the external storage medium 1 and the steps S2 to S9 are executed in the electronic apparatus 10. In step 6, the process 1 is now executed. The processes 2 to N of the step S6 correspond to the processes 2 to N of FIG. 2. As shown in FIG. 2, these processes 2 to N are separately stored in the corresponding external storage mediums 2 to N, and each includes the process B. Accordingly, these processes 2 to N are executed on the internal storage in the electronic apparatus 10 in accordance with the same steps as shown in FIG. 2. Accordingly, in the present invention, when the preceding process and the following process are already copied from the external storage medium to the electronic apparatus, all processes stored in the external storage mediums 2 to N (shown in step S6 of FIG. 4) can be easily executed by the same steps as explained in FIG. 2.

As a result, according to the present invention, it is possible to easily change an external storage medium to another one and to raise the utilization efficiency of the external storage medium so that it is possible to reduce an access time to the external storage medium.

I claim:

1. A method for changing an external storage medium in an information processing system including an electronic apparatus and at least one external storage medium linked to the electronic apparatus, comprising:

providing an internal storage in the electronic apparatus;

delivering a control operation from the electronic apparatus to the external storage medium in a mounting process starting an internal program in the internal storage storing all copied processes in the electronic apparatus;

copying all processes including a preceding process, a main process and a following process, previously stored in the external storage medium, to the electronic apparatus based on the mounting process, the preceding process being necessary to start the main process, and the following process being necessary to complete the main process;

transferring a mounting attribute indicating the mounting process from the electronic apparatus to the external storage medium by using the internal program on the internal storage;

executing the preceding process and the main process in accordance with the internal program in the electronic apparatus;

changing the external storage medium to another one and executing only the main process of said another an external storage medium matching the mounting attribute;

recovering the mounting attribute from said another external storage medium and executing the following process after completion of all processes; and returning the control operation to an initial state before the mounting process.

2. A method for changing an internal storage medium as claimed in claim 1, further comprising the steps of: holding the preceding process and the following process in the internal storage of the electronic apparatus; executing the main process for another external storage medium; and repeating these processes for other remaining external storage media.

3. A method for changing an external storage medium in an information processing system including a computer and at least one external storage medium linked to the computer, comprising:

providing an internal storage in the computer;

delivering a control operation from the computer to the external storage medium in a mounting process;

starting an internal program stored in the internal storage, to store copied processes in the computer;

copying processes of the external storage medium, including a preceding process, necessary to start a main process, and a following process necessary to complete the main process, from the external storage medium to a memory of the computer allowing the external storage medium to be changed to another one during an access operation;

transferring a mounting attribute indicating the mounting process from the computer to the external storage medium by using the internal program on the internal storage;

wherein the step of allowing the external storage medium to be changed to another external storage medium during the access operation further comprises:

executing only the main process of said another external storage medium matching the mounting attribute;

recovering the mounting attribute from said another external storage medium and executing the following process after completion of all processes;

returning the control operation to an initial state before the mounting process.

* * * * *